Oct. 8, 1946.  J. W. BRACKETT  2,408,729
CUTTING MACHINE
Filed April 14, 1944  5 Sheets-Sheet 1

Jesse W. Brackett INVENTOR.

BY
Victor J. Evans & Co.
ATTORNEYS

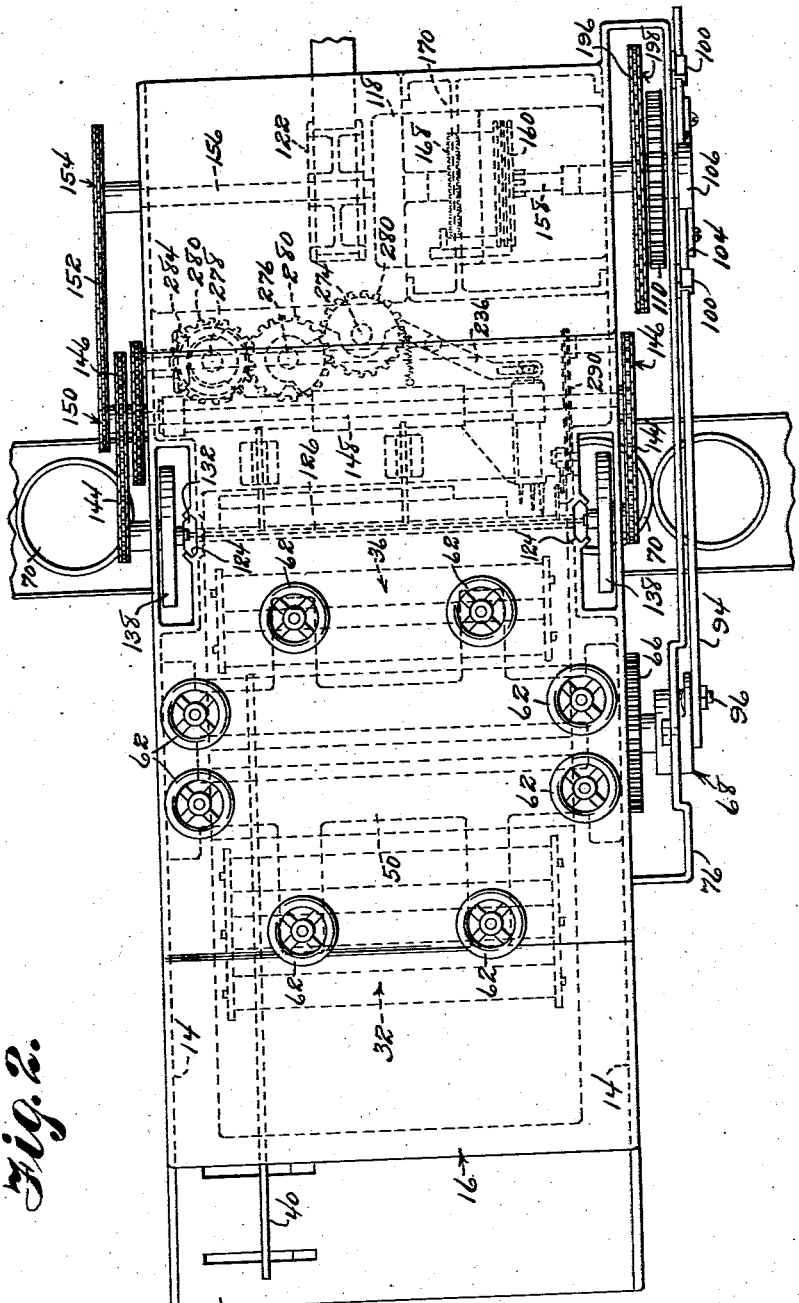

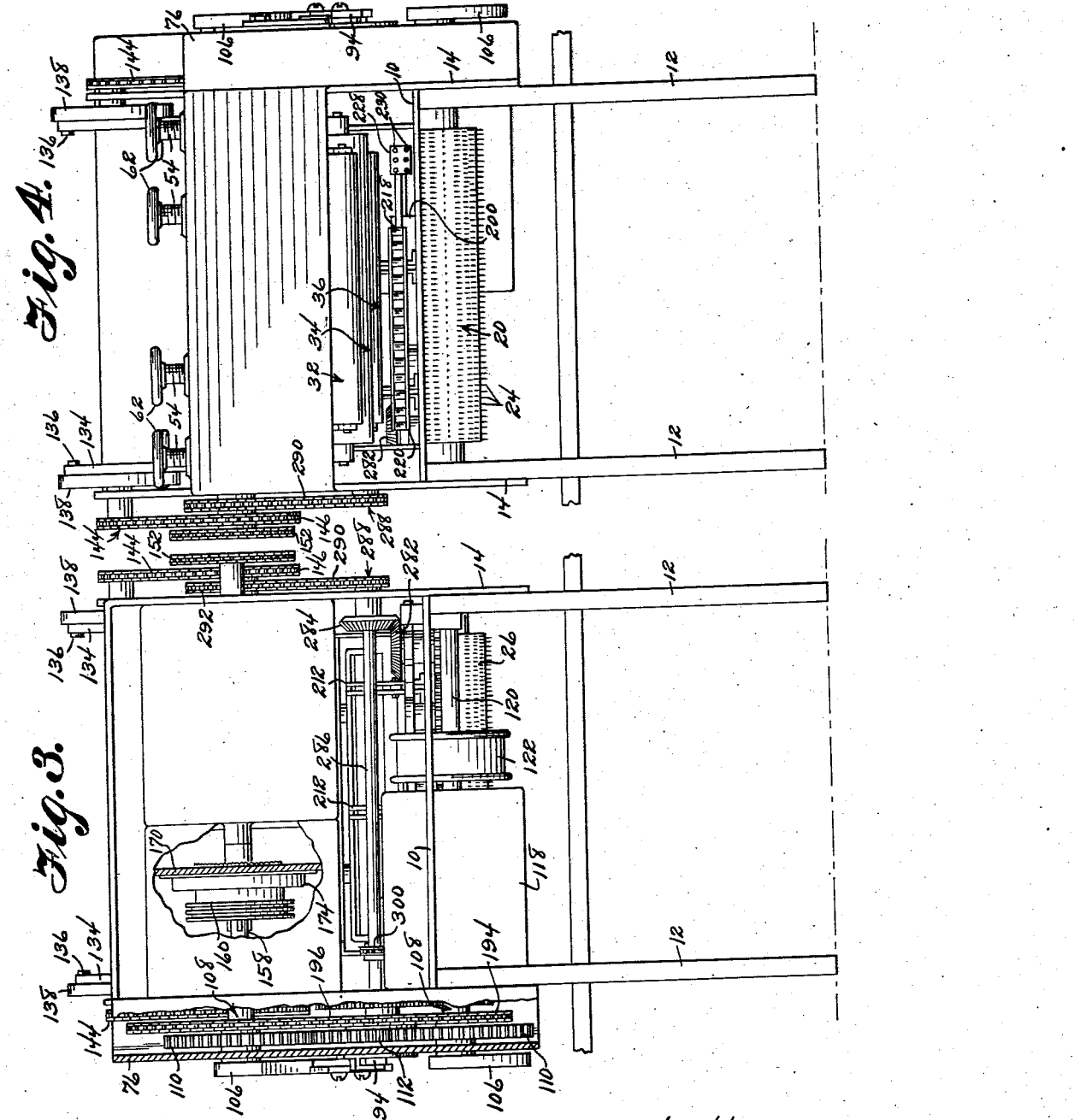

Oct. 8, 1946. J. W. BRACKETT 2,408,729
CUTTING MACHINE
Filed April 14, 1944 5 Sheets-Sheet 4
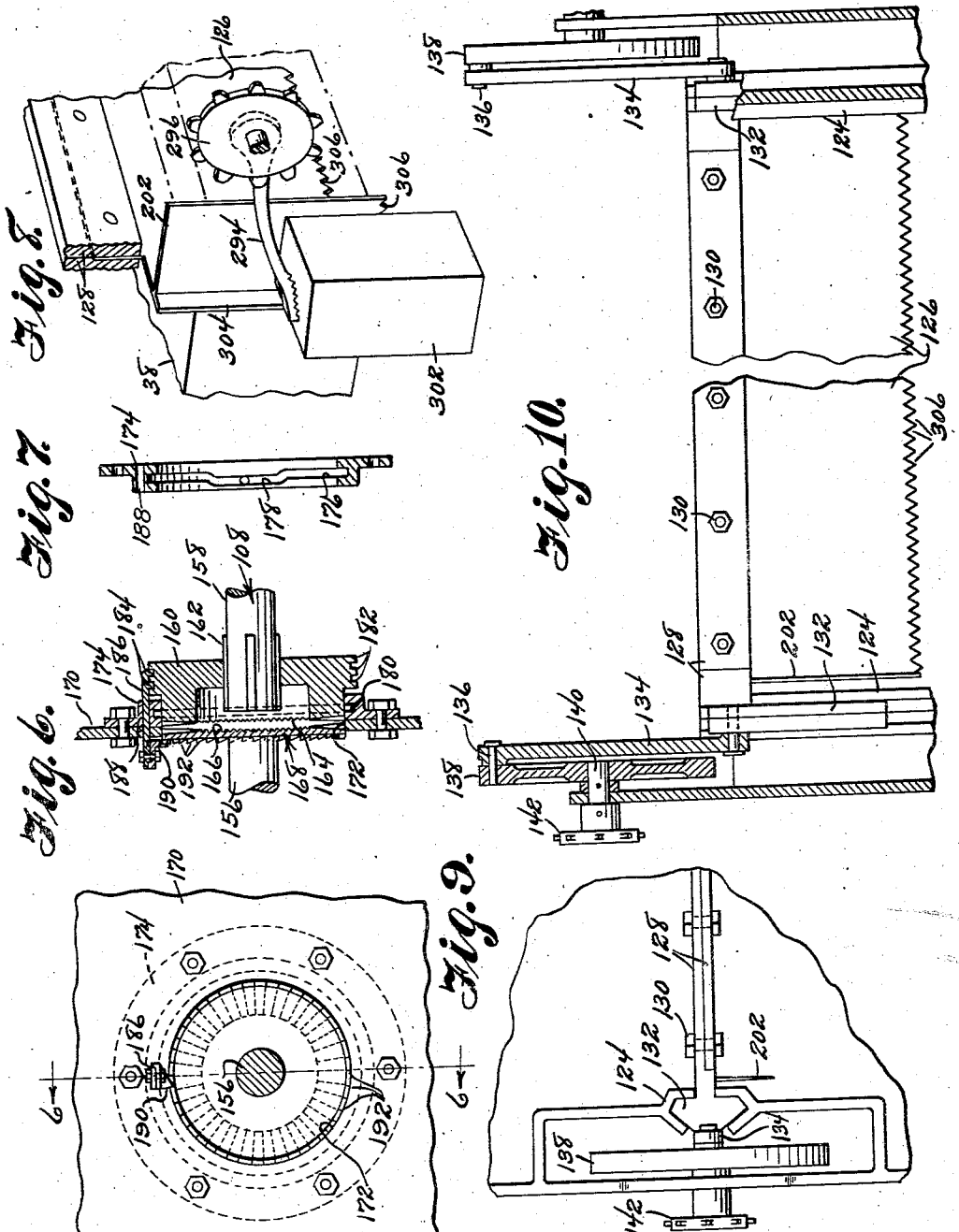
Jesse W. Brackett INVENTOR.
BY
Victor J. Evans & Co.
ATTORNEYS

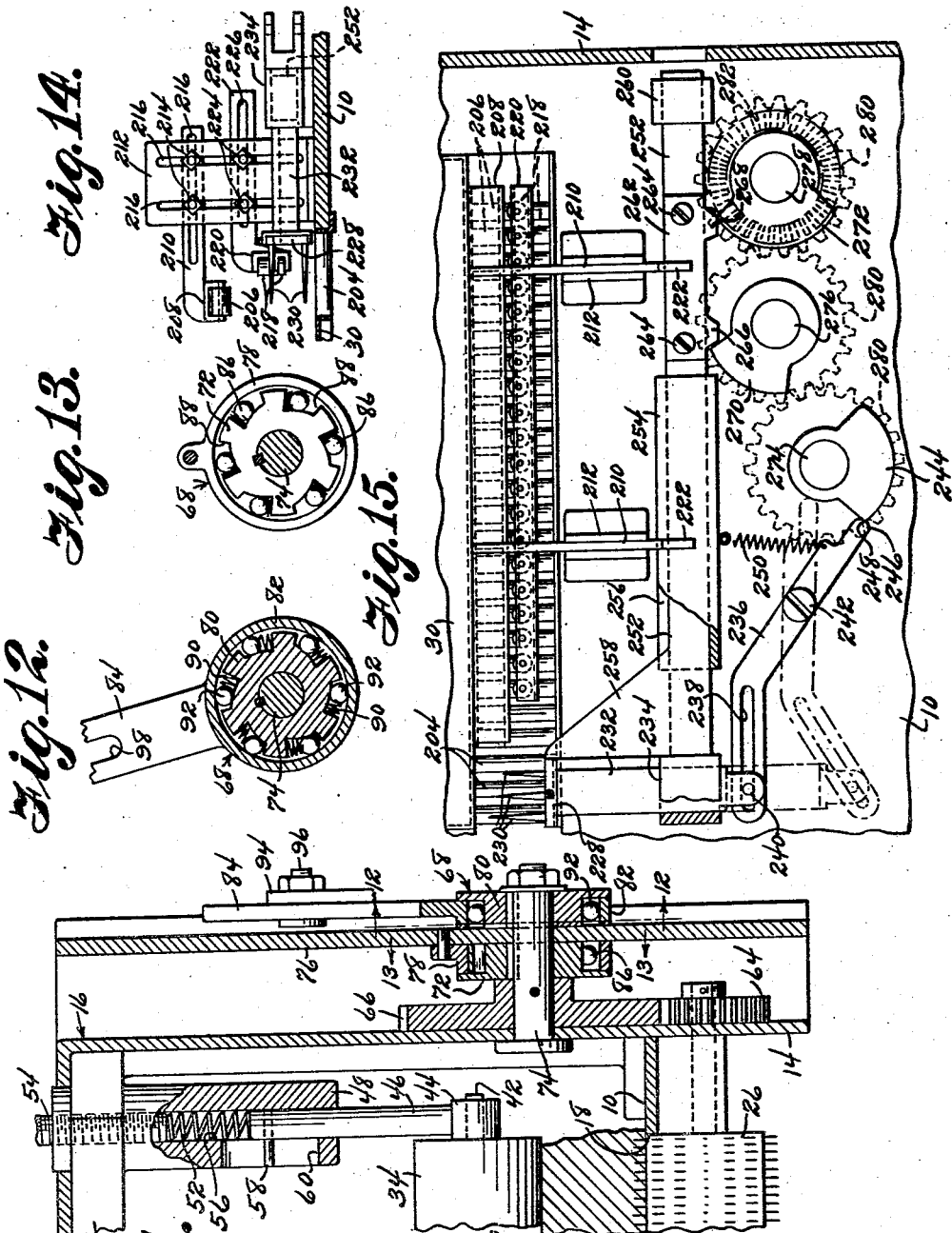

Patented Oct. 8, 1946

2,408,729

UNITED STATES PATENT OFFICE 2,408,729

CUTTING MACHINE

Jesse W. Brackett, New Bedford, Mass.

Application April 14, 1944, Serial No. 531,015

5 Claims. (Cl. 107—12)

My invention relates to the division of material in slab form into pieces of predetermined size and shape and has among its objects and advantages the provision of an improved machine incorporating novel means for reducing a slab of plastic material to a predetermined thickness, advancing the slab step by step to a knife operating in synchronism with the feed of the slab to cut the latter into strips of predetermined width, in which the knife is provided with novel means for dividing the strip into pieces of desired size and shape, wherein a novel strip feeder is employed, together with a knocker mechanism for removing the pieces from the knife. The machine may be employed for reducing various food products to small sizes of desired sizes and shapes.

In the accompanying drawings:

Figure 2 is a top plan view.

Figure 3 is a front end view.

Figure 4 is a back end view.

Figure 5 is a detail view of a momentum arrester and clutch device.

Figure 6 is a sectional view along the line 6—6 of Figure 5.

Figure 7 is a sectional view of a cam.

Figure 8 is a perspective view of a cube knocker.

Figure 9 is a top view of one end of a cutting knife guide.

Figure 10 is a sectional view of the knife operating means.

Figure 11 is an enlarged sectional view illustrating a roller mount and a feed roller coacting therewith.

Figure 12 is a sectional view along the line 12—12 of Figure 11.

Figure 13 is a view taken along the line 13—13 of Figure 11.

Figure 14 is an end view of a strip feeder, and

Figure 15 is a top plan view of the strip feeding mechanism.

Figure 1:
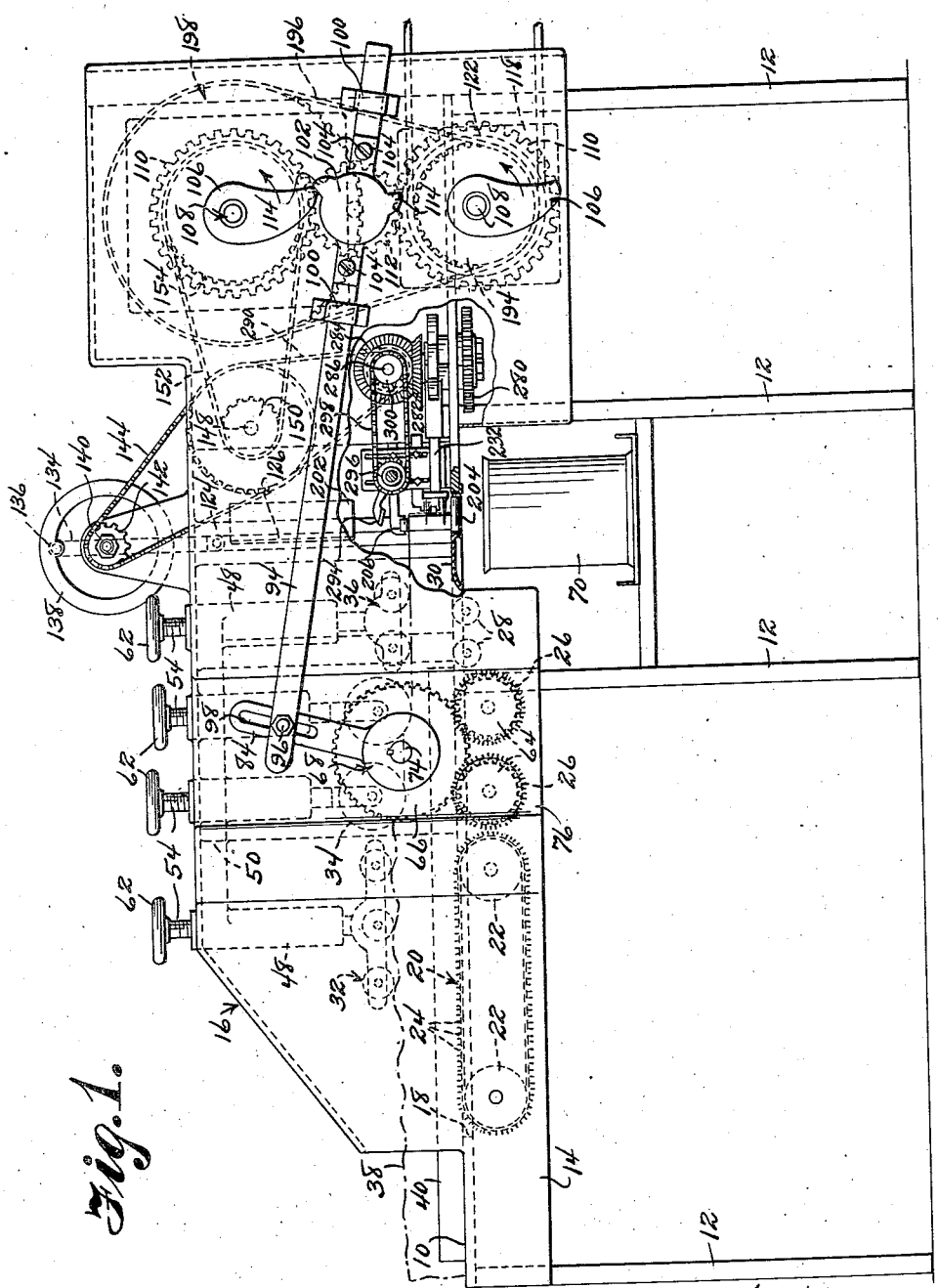
Figure 1 is a side elevational view of my machine with a portion broken away for the purpose of illustration.

In the embodiment of the invention selected for illustration, I make use of a table 10 for supporting material to be subdivided. This table is supported on upright frame members 12 and lies in a horizontal plane. Depending side walls 14 are attached to the table 10, which side walls constitute continuations of a hood 16 extending over the table substantially throughout its entire length. An opening 18 is provided in the table 10 for accommodation of a belt conveyor 20 running on rolls 22. This belt is provided with closely spaced pins 24 for advancing the material through the machine. Two pinned rollers 26 lie in the horizontal plane of the belt conveyor 20. At the delivery side of the second roller 26 are located two small rollers 28 having plain faces. The end of the slab to be cut into strip contour rests on a bed plate 30.

Located above the table 10 is a first gang of presser rolls 32, second presser rolls 34 and a gang 36 of small diameter presser rolls are located vertically of the rolls 28. The rolls 34 reduce the slab 38 to its predetermined thickness. When passing through the machine, the slab 38 is guided along one edge by an adjustable guide flange 40.

All the rolls 32, 34 and 36 may be adjusted vertically, as illustrated in Figure 11 in connection with one of the rolls 34. This roll is provided with a shaft at each end, as at 42, rotatably supported in a bearing 44 at the lower end of a vertical shaft 46 slidably guided in a bearing 48 depending from a yoke 50 attached to the top wall of the hood 16. A compression spring 52 is interposed between the upper end of the shaft 46 and an adjusting screw 54 threadedly connected with the bearing 48, the spring 52 lying in the bore 56 slidably guiding the shaft 46. A stop pin 58 is attached to the shaft 46 and projects into a slot 60 in the bearing 48 to prevent the shaft from dropping out. While one end only of the roll 34 is illustrated in Figure 11, the two ends are identically constructed and mounted, and the adjusting devices for the remaining rolls are of similar construction. Each adjusting screw 54 is provided with a hand wheel 62. Heavy pressure may be exerted on the slab 38 by turning the screws 54 down to place the springs 54 under the desired tension. With little or no spring tension, the rolls are pressed gently on the slab so that the rolls may be adjusted to desired pressures, depending upon the nature of the material being handled.

Each of the rolls 26 is provided with a gear 64 meshing with a drive gear 66. Intermittent motion is imparted to the rolls 26 by a clutch 68 to impart clockwise motion to the rolls when viewing Figure 1. The action is such as to advance the slab 38 a predetermined distance, depending upon the width of the strip to be cut from the slab, and then to dwell for a period of time which permits the strip to be cut into cubes and dropped into a receptacle 70.

In Figures 11, 12 and 13 the clutch 68 comprises a first overrunner clutch part 72 keyed to a shaft 74 rotatably journaled in the hood 16 and a housing plate 76. This shaft is keyed to the gear 66. A clutch ring 78 is keyed to the plate 76 and extends circumferentially of the clutch part 72. A second clutch part 80 is keyed to the shaft 74 and has a clutch ring 82 extending circumferentially thereabout. To this clutch ring is attached an oscillating arm 84. Spring pressed roller elements 86 are housed in recesses 88 in the clutch part 72, the bottom faces of the recesses being tangentially arranged with respect to the axis of the clutch ring 78 so that the clutch part may rotate freely in one direction relatively to the clutch ring 78 but is restrained from rotation in the opposite direction so as to prevent reverse rotation of the feeding rollers 26. The clutch part 80 is also provided with recesses 90 for housing spring pressed roller elements 92. The bottom faces of these recesses are also tangentially arranged so that the clutch ring 82 may turn freely in one direction relatively to the clutch part 80 but becomes fixedly related thereto when the clutch collar is turned in the opposite direction. In Figure 1, counterclockwise rotation of the arm 84 imparts clockwise motion to the feeding rollers 26 for advancing the slab, while clockwise rotation of the arm is consummated independently of the gear 66 by reason of the clutch 68 so as not to impart any reverse rotation to the feeding rollers 26.

One end of a link 94 is pivotally connected with the arm 84 by a bolt 96 extending through a slot 98 in the arm. This link is slidably guided in bearings 100 attached to the hood 16 and is provided with a cam 102 attached to the link by bolts 104. This cam is actuated by two rotary cams 106 respectively attached to shafts 108. Each shaft 108 is provided with a gear 110, see Figure 3, meshing with a gear 112. The cam 102 is located in the plane of the rotary cams 106, and includes two projections 114 respectively engaged by the rotary cams. Figure 1 illustrates the upper rotary cam 106 in a position to pass over the upper projection 114 to position the link 94 in one extreme position, with the lower projection 114 positioned for engagement with the lower rotary cam 106 to slide the link 94 to its other extreme position. Thus the projections 114 are successively engaged by the respective rotary cams 106 to impart reciprocatory motion to the link 94 and oscillatory motion to the arm 84. The stroke of the link 94 may be varied through substitution of cams having larger or smaller throw of projection arrangements. The cam 102 is detachably connected with the link to facilitate such substitution.

The lower shaft 108 is driven by a speed reducer 118 operated by a shaft 120 to which is connected a drive pulley 122 for connection with a motor, not shown. Vertical guides 124 are located at opposite sides of the machine for slidably guiding a cutting blade 126, see Figures 2, 9 and 10. This knife is supported between bars 128 secured into a unitary structure by bolts 130, one of the bars 128 being provided with two flange like bodies 132 slidable in the guides 124. To each flange 132 is pivotally connected the lower end of an arm 134 having its upper end pivotally connected at 136 with a wheel 138 constituting a crank for operating its arm 134 to impart reciprocatory motion to the blade 126. Each wheel 138 is attached to a rotative shaft 140 provided with a sprocket 142 for connection with a chain 144. These chains pass around sprockets 146 keyed to a rotative shaft 148. This shaft is provided with a sprocket 150 connected with a chain 152 passing around a sprocket 154 driven by the upper shaft 108.

The upper shaft 108 comprises co-axial shaft sections 156 and 158. In Figure 6, a clutch member 160 is splined to the shaft 158, as at 162, so that the clutch part may be shifted longitudinally of the shaft but is keyed for rotation therewith. One face of the member 160 is provided with teeth 164 engageable with teeth 166 on one face of a clutch disk 168 attached to the shaft part 156. These two shaft parts may be connected as a unit by moving the clutch member 160 into engagement with the clutch disk 168. A plate like frame member 170 is provided with an opening 172 loosely receiving the clutch member 160 and the disk 168. To the plate 170 is bolted a cam ring 174 having a groove 176 provided with an offset run 178. This ring is of such internal diameter as to permit the clutch member 160 to rotate and shift axially relatively to the ring. A pin 180 is attached to the clutch member 160 and rides in the groove 176 to shift the clutch member longitudinally on the shaft section 158 into and out of engagement with the clutch disk 168.

Circumferential ribs 182 are provided on the clutch member 160 having meshing engagement with ribs 184 on a bar 186 slidably mounted in aligned openings 188 in the member 170 and the ring 174. To the bar 186 is attached a jaw 190 engageable with teeth 192 on the face of the disk 168 opposite the teeth 166 in one position of the clutch member 160. In the other position of the clutch member 160 the jaw 190 is clear of the teeth 192 to permit free rotation of the disk. The jaw 190 functions as a momentum arrester upon disengagement of the shaft sections 156 and 158.

A sprocket 194 is attached to the lower shaft 108 and connects with a chain 196 passing around a relatively large sprocket 198 attached to the section 158 of the upper shaft 108. The upper gear 110 rotates as a unit with the upper cam 106 but is freely mounted on the upper shaft 108. The chain 196 drives the upper shaft 108, while the intermediate gear 112 supplies power to the upper gear 110, the two gears 110 being of the same size so that the two cams 106 will maintain the same relative positions at all times.

While the cams 106 rotate continuously, the slab 38 is advanced forwardly at spaced intervals and the clutch 68 disengages during the descending and ascending movement of the blade 126. At the same time, the clutch structure of Figure 6 functions to arrest movement of the cutting blade in its uppermost position while the slab is being advanced into position for cutting another strip therefrom. Figure 7 illustrates the offset run 178 as being of relatively short length with respect to the circumference of the groove 176. The clutch structure of Figure 6 is engaged while the pin 180 is riding in the groove 176 outside the run 178, which groove is of sufficient length to permit the strip cut from the slab to be cut into the requisite number of pieces.

Means for cutting the strip 200 of Figure 1 into cubes comprises a right angular flange 202 on the blade 126. This strip lies on a line of horizontal rollers 204, see Figures 14 and 15. An upper line of rollers 206 hold the strip in position on the upward stroke of the flange 202. The table 10 affords support for the rollers 204, while the rollers 206 are mounted in a frame 208 carried by arms 210 adjustably mounted on upright supports 212 through the medium of bolts 214 extending through slots 216 in both the supports and the arms. A row of rollers 218 is arranged in a straight line for rotation about vertical axes in a common plane, and arranged to engage one side of the strip 200. These rollers are also mounted in a frame 220 carried by arms 222 adjustably mounted on the upright supports 212 through the medium of bolts 224 extending through the slots 216 in the supports 212 and slots 226 in the arms 222.

As the material is advanced intermittently, the knife 126 reciprocates and severs a strip therefrom which has been designated as 200. The horizontal rollers then feed the severed strip laterally under the angular portion of the blade and the knife and the angular blade portion continuously reciprocate whereupon the angular blade portion severs into small sections the laterally fed strip.

In Figures 14 and 15 a head 228 is provided with pins 230 arranged to be projected into the body of the strip 200 for advancing the strip step by step to be severed by the flange 202. This head is slidably guided by a bar 232 slidable in a bearing 234 and reciprocated through the medium of a link 236. This link is provided with a slot 238 for the reception of a pin 240 carried by the bar 232. The link 236 is pivotally connected intermediate its ends, as at 242, with the table 10. A rotary cam 244 actuates the link for positively pivoting the same to the full line position of Figure 15. As the end 246 of the link passes over the corner 248 on the cam, a tension spring 250 snaps the link to the dotted line position for retracting the head 228 sufficiently far to bring the pins 230 clear of the strip.

The bearing 234 is attached to one end of a bar 252 slidable in a guide 254 mounted on the table 10. This guide is slotted at 256 to provide accommodation for a lateral projection 258 engageable with the head 228 to afford additional support therefor when the strip is being pushed underneath the flange 202. A bearing 260 is mounted on the table 10 to afford additional support for the bar 252. To one face of the bar 252 is bolted a plate 262 through the medium of bolts 264. This plate is provided with two projections 266 and 268 respectively engageable by cams 270 and 272. Shafts 274, 276 and 278 are connected with the cams 244, 270 and 272 and are rotatably journaled in the table 10. Gears 280 are respectively attached to the shafts and mesh to impart rotation to the cams. When viewing Figure 15, the cam 244 rotates counterclockwise, the cam 270 turns clockwise, while the cam 272 rotates counterclockwise. Counterclockwise rotation of the cam 272 shifts the bar 252 to the left for imparting a feeding stroke to the head 228 and the pins 230. As the piece is cut from the strip 200, the cam 270 is brought into engagement with the projection 266 for moving the bar 252 to the right to bring the pins 230 to a position inwardly of the severed end of the strip. The cam 244 operates in timed sequence with the action of the cams 270 and 272 so as to impart reciprocatory motion to the bar 232 at the proper time.

To the shaft 278 is attached a bevel gear 282 meshing with a bevel gear 284 mounted on a shaft 286 provided with a sprocket 288 driving a chain 290 passing around a sprocket 292 attached to the shaft 148.

Pieces severed by the flange 202 are pushed therefrom in the event of adherence through the medium of a knocker 294 attached to a sprocket 296, see Figure 8, which sprocket is rotatably mounted on one of the guides 124, see Figure 2, and driven by a chain 298. This chain passes around a sprocket 300 attached to the shaft 286. This knocker rotates in a counterclockwise direction when viewing Figure 8 to remove the piece 302 from the flange 202 and the short end length 304 of the blade 126. Both the blade and the flange are preferably toothed along their lower edges, as at 306. The cutting edges will of course depend upon the nature of the material being cut.

The greater length of the slab is supported on the conveyor 20, the rolls 26 and 28. The upper rolls are adjustable so that the slab may be formed to the desired thickness. The conveyor 20 operates to support the slab for easy movement and to move the slab material uniformly throughout its entire width because of the pins 24. The rolls 34 are preferably ribbed longitudinally and are relatively heavy to perform the bulk of the pressing action.

Without further elaboration, the foregoing will so fully explain my invention, that others may, by applying current knowledge, readily adapt the same for use under various conditions of service.

I claim:

1. In a machine as described, the combination of means for intermittently advancing a body of plastic material, means for pressing the material into a slab of predetermined thickness, a knife comprising a straight blade and an angular blade element attached thereto, means for imparting lateral movement to successive strips cut from the material by said straight blade to bring successive strips underneath the angular blade element to be cut into pieces of predetermined size, means for actuating the knife, and means for actuating said advancing means in timed sequence with said knife.

2. In a machine as described the combination of means for intermittently advancing a body of material to be cut, pressure rollers reducing the material to a predetermined thickness, a vertically reciprocating knife blade and an angular blade thereon, means for laterally moving a severed strip of material in the path of movement of the angular blade to cut the strip into small sections of predetermined size, means for removing the sections from the angular blade, and a container receiving the removed section.

3. In a machine as described the combination of means for intermittently advancing a body of material to be cut, pressure rollers reducing the material to a predetermined thickness, a vertically reciprocating knife blade and an angular blade portion located at one end thereof, means for laterally moving a severed strip of material in the path of movement of the angular blade to cut the strip into small sections, means for removing the strip from the angular blade, and a container receiving the removed sections.

4. In a machine as described the combination of means for intermittently advancing a body of material to be cut, pressure rollers reducing the material to a predetermined thickness, a vertically reciprocating knife and an angular blade thereon, a roller conveyor for moving a severed portion of the material laterally in the path of movement of the angular blade to cut the severed portion into small pieces, means for removing the pieces from the angular blade, and a container receiving the removed pieces.

5. In a machine as described the combination of means for intermittently advancing a body of material to be cut, pressure rollers reducing the material to a predetermined thickness, a vertically reciprocating knife having an end flange forming an angular blade portion, a roller conveyor for moving a severed strip of material laterally in the path of movement of the angular blade portion to cut the severed strip into small pieces, means for removing the pieces from the angular blade portion, and a container receiving the removed pieces.

JESSE W. BRACKETT.